(12) United States Patent
Inman et al.

(10) Patent No.: US 7,938,959 B1
(45) Date of Patent: May 10, 2011

(54) FRYER OIL USAGE SYSTEM

(75) Inventors: Ronald C. Inman, Baytown, TX (US); Joseph N. Judice, Jr., Baytown, TX (US)

(73) Assignee: Inman Restaurant Solutions LLC, Baytown, TX (US)

( * ) Notice: Subject to any disclaimer, the term of this patent is extended or adjusted under 35 U.S.C. 154(b) by 26 days.

(21) Appl. No.: 12/130,673

(22) Filed: May 30, 2008

Related U.S. Application Data (60) Provisional application No. 60/961,954, filed on Jul. 25, 2007.

(51) Int. Cl.
*A47J 37/12* (2006.01)

(52) U.S. Cl. .............. 210/167.28; 210/195.1; 210/196; 210/251; 210/257.1; 210/258; 210/259; 210/DIG. 8; 99/408; 137/206; 137/208; 137/209

(58) Field of Classification Search .................. None
See application file for complete search history.

(56) References Cited

U.S. PATENT DOCUMENTS

| | | | |
|---|---|---|---|
| 4,502,373 A * | 3/1985 | Keating | 99/337 |
| 4,646,793 A * | 3/1987 | Sherratt | 141/1 |
| 4,913,922 A | 4/1990 | Hawkes et al. | |
| 4,959,144 A * | 9/1990 | Bernard et al. | 210/232 |
| 5,228,985 A | 7/1993 | Wells et al. | |
| 5,249,511 A * | 10/1993 | Shumate et al. | 99/408 |
| 5,617,777 A * | 4/1997 | Davis et al. | 99/408 |
| 5,964,258 A | 10/1999 | Schoenbauer et al. | |
| 6,009,794 A * | 1/2000 | Casey et al. | 99/330 |
| 6,041,802 A * | 3/2000 | Nelson | 137/14 |
| 6,202,543 B1 | 3/2001 | Moya et al. | |
| 6,254,790 B1 * | 7/2001 | King et al. | 210/767 |
| 6,783,685 B2 | 8/2004 | Hwang | |
| 6,792,983 B2 * | 9/2004 | Allora | 141/98 |
| 2002/0174778 A1 | 11/2002 | Petrusha | |

\* cited by examiner

*Primary Examiner* — Robert James Popovics
(74) *Attorney, Agent, or Firm* — Andrew W. Chu; Craft Chu PLLC (57) ABSTRACT

A system for fryer oil usage has at least one fryer having a vat and a valved drain, a first oil storage container having an oil delivery line connected with the vat, a second oil storage container connected with the valved drain and vat of the fryer, both containers having an inert gas blanket in a vapor space thereof, a first filter connected with the valve of the drain of the fryer, a pump connected with the first filter and the second oil storage container and in valved communication with the vat, a polishing line connected with the pump and with the first filter, and a three-way valve movable to a first position for blocking the flow of oil, a second position for allowing the flow of oil to the second oil storage container, and a third position for allowing the flow of oil to the vat of the fryer.

6 Claims, 5 Drawing Sheets

FRYER OIL USAGE SYSTEM

CROSS-REFERENCE TO RELATED APPLICATIONS

The present application claims priority from U.S. Provisional Application Ser. No. 60/961,954, filed on Jul. 25, 2007, and entitled "Fryer Oil Supply, Recovery and Filtration System".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to deep oil fryers used for food preparation. More particularly, the present invention relates to the storage of fryer oil, both new and used. More particularly, the present invention relates to filtration of fryer oil. More particularly still, the present invention relates to the use of recycled oil in deep oil fryers.

2. Description of Related Art Including Information Disclosed Under 37 CFR 1.97 and 37 CFR 1.98

Restaurant fryer oils have largely consisted of hydrogenized oil in the past because they are more stable and less prone to spoilage; however, these hydrogenized oils are made of transfats which are unhealthy. Healthier, non-hydrogenized oils have become more popular and are even required for restaurants in certain areas of this country. However, non-hydrogenized oils and those high in polyunsaturated fats have a shorter shelf life than unhealthy hydrogenized trans fat oils because they are more susceptible to oxidation in addition to spoilage due to heat and light exposure.

Non-hydrogenized oils are susceptible because most cooking oils contain natural antioxidants. As cooking oils are exposed to oxygen, including during storage, filtration, and cooking, they slowly become rancid over time causing an unpleasant aroma and acrid taste. This oxidation also diminishes the nutrient value of vitamins, mineral, and essential amino acids in the oil. When food is dipped in and out of the hot fryer oil during cooking, the surface of the cooking oil changes over, causing depletion of the natural antioxidants even more rapidly.

Traditional methods of storing unused oil in restaurants, including storage in large plastic bottles and refillable interior tanks, have several problems. For example, smaller plastic oil jugs and cardboard boxes cause excessive waste disposal in the restaurant, require manpower to refill the fryers, and create an unsafe work environment due to heavy lifting, oil spillage, and sanitation concerns. When oil is poured into the fryers from traditional plastic oil jugs, the air space above the remaining oil in the jugs contains a larger volume of air than before, leaving more oxygen in the container to degrade the oil. This causes oxidation and introduces airborne contaminates that degrade the stored oil.

Larger refillable interior containers are occasionally used by restaurants; however, they also expose the oil to airborne contaminates and air (causing oxidation), reducing freshness and leading to unpleasant aromas and flavors. These containers are also held at atmospheric pressure, exposing the oil to humidity and environmental contaminates.

Traditionally, waste fryer oil is disposed of and stored by transferring it from a fryer to a pit, trap, sump, or container. The waste oil in these containers is sometimes used to make biodiesel. Biodiesel is made by chemically reacting vegetable oil with alcohol and a catalyst in a process called transesterification. This chemical reaction breaks down the fat molecules in the oil into an ester, which is the biodiesel fuel and glycerol. Many makers of biodiesel tend to avoid rancid oils because rancid oil produces less biodiesel and may not even react to make it. In addition, airborne contaminates and rancidity affect the value of the oil as a recyclable product.

Waste fryer oil should be turned into biodiesel as soon as possible or stored in a proper environment to make it more usable as a fuel. Waste oil already contains free fatty acids caused by cooking. As the waste oil oxidizes and becomes more rancid with air contact, the amount of free fatty acids increases. Vegetable oil, which has less free fatty acids, requires less chemical treatment to convert it to usable diesel fuel, and results in a greater percentage of the oil converting to usable biodiesel.

There are several waste oil storage containers on the market for indoor storage of waste oil; however, none of these containers store the waste oil in a manner that optimizes its recycled use for biodiesel, consumer products, animal food, or other various uses. Most containers store oil at atmospheric pressure and with air in the vapor space. As discussed above for unused oil storage containers, this method of storage subjects waste oil to oxidation, humidity and accelerated deterioration.

Waste oil discharge to an outdoor sump or grease trap is subjected to weathering, moisture, oxidation, debris and environmental contamination. The grease trap or sump is perhaps the worst storage method because it dramatically reduces the possibility of recycling the waste oils into usable product because the waste fryer oil is depleted of antioxidants and is subject to rapid deterioration due to oxidation. In this type of storage, waste oil can become rancid very quickly. Exposure to air, humidity, and environmental contaminates only hastens the rancidity of the waste oil. It also makes the oil more expensive to recycle and reduces its worth. Oils from restaurant grease traps can contain residues from pesticides, cleaning agents, debris, and any number of other contaminates. Removing these contaminants along with any moisture requires additional refining during filtration, which takes more time and increases the cost of recycling.

Some waste oil storage containers exist on the market for recycling the waste fryer oil in the fryers. Some are even designed for outdoor storage, however, all of them are subject to atmospheric conditions and allow oxidation of the waste oil. This not only leads to the rancid oil smell during storage, but causes the oil to deteriorate, reducing its recycled worth.

Traditionally, waste oil in a deep fryer system is filtered in order to increase its useful life. Unfortunately, the most efficient and quickest filtration systems require a very low-viscosity oil. High temperature oils, in the typical fryer temperature range of 350-400° F., have low viscosity and are more easily filtered than cooler oil. Filtering heated oil allows the hot oil to be returned to the fryers, reducing energy usage otherwise needed for reheating oil. Therefore, filtering hot fryer oil is more energy efficient and easier to filter than cooled oil.

Typically, a fast food restaurant will filter the oil in each vat of the fryer once or twice per day. The typical deep fryer system in a restaurant will include a plurality of fryer vats. Most existing oil filtration systems, whether portable or stationary, require oil to gravity-drain from the fryer into a filter housing. The oil flows through a filter mesh, cloth or steel, and then is pumped back into the fryer vat. Sometimes the restaurant will flush the oil through the vat for several minutes, allowing it to flow from the fryer vat into the filtering housing and back through the filter several times in a process called "polishing" the oil.

Filtering hot oil causes several safety concerns, primarily for burns. The United States Occupational Safety and Health Administration recommends against handling hot oil. However, most restaurants that use deep fryers typically ignore these recommendations. Hot oil is handled because it takes longer to filter the oil when it cools, the quality of the filtered oil is less when it is filtered cold as opposed to when it is filtered hot, and the time it takes for the oil to cool decreases productivity and wastes energy that is needed to reheat the cooled oil.

Typical filtration systems are designed for indoor use in the kitchen area of a restaurant. The systems are usually not sealed and sometimes require moving containers of hot oil around the kitchen of the restaurant where oil spills create slipping hazards. The oil containers where the oil is stored are open to the atmosphere. Likewise, the filter systems are open to the atmosphere, which allows the odor of the old oil to discharge into the restaurant. These indoors system are not designed to be used away from the kitchen in an outdoor environment so as to remove the "old oil" smell from the kitchen. Oil is usually stored in containers that are indoors and have the "old oil" smell.

It is desirable to keep unused oil as fresh as possible during storage so as to preserve the useful life of unused oil. It is similarly desirable to keep waste fryer oil as fresh as possible during storage and filtering so as to maximize the value of waste oil as a recyclable material. This is best accomplished in a reduced oxygen environment, preferably in the absence of oxygen and other airborne contaminants. Waste fryer oil is also preserved by minimizing its exposure to moisture and humidity and other airborne contamination during storage.

Various patents have issued and applications published relating to the filtering and storage of fryer oil. For example, U.S. Pat. No. 5,228,985, issued to Wells et al., describes a portable cooking oil filtering unit that has an outer housing completely enclosing all the filter stages and providing access to the stages for maintenance purposes via doors and removable closures. The housing has an inlet conduit for connection to a cooking vat drain outlet, and an outlet conduit for returning filtered oil to the cooking vat. A first stage filter in the housing is connected to the inlet conduit for filtering relatively large size particles from the oil, and the filtered oil is connected to at least one additional filter stage for filtering smaller particles from the oil. A pump is connected downstream of the final filter stage, between that filter stage and the outlet conduit, for drawing oil through the filter stages under vacuum rather than pumping it through the filters under positive pressure. One of the filter stages is accessible to allow oil-life enhancing chemicals to be added to the oil.

U.S. Pat. No. 4,913,922, issued to Hawkes et al., describes a method and apparatus arrangement for continuous cooking of food in hot oil with clarification, purification and recycle of oil. Particulates-laden oil from the cooker is passed through a comminutor then through a precoat filter to remove particulates. The filter bed may also contain a quantity of an adsorbent to remove free fatty acid from the oil before reuse. Elevated temperatures are maintained and the operation is conducted in an oxygen-poor environment. An apparatus arrangement includes a cooker, a comminutor and an enclosed precoat filter through which all oil passes. Appropriate piping and controls are provided.

U.S. Pat. No. 4,646,793, issued to Sherratt, describes a cooking oil and grease recycling apparatus for collecting hot cooking oil from fryer vats in restaurants and industrial food preparation companies and replacing it with fresh oil or grease. Holding tanks are connected to the frying vats by piping, which includes valves and pumps to permit the used oil or grease from the frying vats to flow into a holding tank. The holding tanks are in a location accessible for trucks to connect a hose for pumping the used liquid oil or grease into the truck tank. A second hose is connected from the truck tank to pump new, fresh oil or grease into a distribution tank which are mounted above the frying vats at any convenient place in the restaurant. The invention also includes a portable system preferably including a pump to distribute oil to the frying vat and a holding tank.

U.S. Pat. No. 6,783,685, issued to Hwang, describes an invention that is directed to an oil treatment apparatus and method for treatment of oil which transports oil to be treated from a source through a first conduit to a treatment station. The treatment station includes a filter system capable of extracting particulate material from the oil and removing the particulate material from the filter system as it is removed from the oil. The treated oil may then be transported for reuse, preferably in a continuous cycle with the source of the oil. A prefiltering system may be used to further enhance maintaining the quality of the oil and/or in efficiently treating the oil while accommodating throughput requirements. The prefiltering system may include a comminuter to reduce the size of larger particles in the oil, a coarse filtering system to remove larger particles, and a system to introduce a treatment material to the oil or other systems to facilitate processing. The filtering system is designed to remove particles from the oil having a size of fifteen microns or smaller in the preferred embodiment.

U.S. Patent Publication No. 2002/0174778, issued to Petrusha, describes a system for removing cooking oil from a fryer vat that includes a storage tank for storing cooking oil. The storage tank is disposed remotely from the fryer vat and in fluid communication with the fryer vat through a fixed piping system. A pump is arranged to transfer cooking oil from the fryer vat to the storage tank through the fixed piping system. A shut-off valve for directing cooking oil transferred by the pump to the storage tank is also provided. The shut-off valve is movable between an open position wherein the shut-off valve permits cooking oil to flow through the fixed piping system to the storage tank and a closed position wherein the shut-off valve blocks flow of cooking oil through the fixed piping system to the storage tank. A level sensor is arranged to detect whether the cooking oil in the storage tank is at a predetermined level. When the level sensor detects that the cooking oil in the storage tank is at the predetermined level, the shut-off valve moves from the open position to the closed position or the pump stops transferring cooking oil to the storage tank. An alarm device can provide an audio or visual alarm signal when the level sensor detects that the cooking oil is at the predetermined level.

U.S. Pat. No. 6,202,543, issued to Moya et al., describes a system for use with a hot oil fryer of the type which cooks food products in hot oil. Particulates from the food are shed into the hot oil in the fry during the cooking operation. The fryer has an inlet to receive hot oil, and an outlet for recirculation of hot oil.

U.S. Pat. No. 5,964,258, issued to Schoenbauer et al., describes a bulk cooking oil supply and disposal transport system and method for the supply of cooking oil to and the removal of waste oil from a receiving facility. The system includes a transport vehicle with a supply and a waste oil container. An oil conduit system is connected with the supply and waste container to selectively deliver and remove oil through oil fittings. Pumps and valves are disposed within the oil conduit system for restricting the flow of the cooking oil therethrough. A first fluid meter measures the amount of cooking oil delivered to the receiving facility and a second fluid meter measures the amount of waste oil removed from the receiving facility. A control device receives signals indicating the level or amount of oil delivered or removed through the oil conduit system. Signals are generated by sensors at the receiving facility or from the fluid meters monitoring flow through the system. A data reporting device is provided on the vehicle to document the amount of cooking oil delivered to and the amount of waste oil received from the receiving facility.

It is an object of the present invention to provide a sanitary, oxygen-free storage environment for new fryer oil storage.

It is another object of the present invention to provide an environment for new fryer oil storage that reduces contamination and retains freshness and flavor of the oil during storage in either an indoor or an outdoor environment.

It is still another object of the present invention to provide a sanitary, oxygen-free storage environment for waste oil storage.

It is another object of the present invention to provide an environment for waste oil storage that reduces contamination and retains freshness and flavor of the oil in either an indoor or an outdoor environment.

It is another object of the present invention to provide a filtration system that filters hot oil.

It is another object of the present invention to provide a filtering system that minimizes fryer oil exposure to the environment.

It is still another object of the present invention to provide a filtering system that eliminates the need for handling hot waste oil.

It is yet another object of the present invention to provide a filtering system that allows the user to choose to continuously filter waste oil or send waste oil to a waste oil storage container or recycle waste oil back to the fryer.

It is yet another object of the present invention to provide a fryer oil usage system that is weather-resistant.

It is yet another object of the present invention to provide a fryer oil supply and recycling system that is located outside of the restaurant so as to minimize the rancid order of used oil inside the restaurant.

These and other objects and advantages of the present invention will become apparent from a reading of the attached specification and appended claims.

BRIEF SUMMARY OF THE INVENTION

The present invention is a system for fryer oil usage comprising at least one fryer having a vat and a drain having a valve means for opening and closing the drain, a first oil storage container having an oil delivery line in fluid communication with the vat of the fryer and an inert gas blanket in a vapor space of the first oil storage container, and a second oil storage container having an inert gas blanket in a vapor space of the second oil storage container and being in fluid communication with the valve means of the drain of the fryer and being in valved communication with the vat of the fryer. The first oil storage container is a container of stainless steel or other material maintaining a positive pressure and temperature rating of up to 400° F. The second oil storage container is a container of stainless steel or other material maintaining a positive pressure and temperature rating of up to 400° F.

The fryer oil usage system further comprises an inert gas supplying means for maintaining a constant pressure in the vapor space of the first oil storage container and in the vapor space of the second oil storage container and being in valved communication with the first and second oil storage containers, a first filtering means for filtering oil from the fryer in fluid communication with the valve means of the drain of the fryer, a pumping means for filtering the oil passing from the fryer in fluid communication with the first filtering means and the second oil storage container and in valved communication with the vat of the fryer and the pumping means for vacuuming oil from the fryer through the first filtering means, a polishing means for recycling oil through the first filtering means in fluid communication with the pumping means and with the first filtering means, a selecting means for selecting the direction of a flow of oil being movable to a first position for blocking the flow of oil, a second position for allowing the flow of oil to the second oil storage container, and a third position for allowing the flow to the vat of the fryer and being in fluid communication with the pumping means and with the polishing means and with the second oil storage container, and a second filtering means for filtering oil passing from the fryer being in fluid communication with the selecting means and in valved communication with the fryer.

The first filtering means comprises a housing able to withstand 400° F. and able to operate under positive internal pressure or a vacuum. The housing has a body and lid or hatch opening, allowing access for changing the filter. The housing can be rectangular, cylindrical or another shape. A filtration media suitable for removing solids from the oil of the fryer is located inside the housing and removable through the lid or hatch opening. A seal is located between the body and the lid of the housing and has the ability to withstand 400° F. and has the ability to operate in a vacuum on positive internal pressure.

An alternative second filtering means comprises a housing having a removable cover or hinged cover. The housing is in fluid communication with the selecting means and in valved communication with the vat of the fryer. A filtration media is removable from the housing through the cover or hatch opening. The filtration media is suitable for removing particulate matter that is smaller than the solids removed by the first filtering means.

The first filtering means, the second filtering means, the pumping means, second oil storage container, the first oil storage container, the inert gas supplying means, the polishing means, and the selecting means are all positioned in spaced relation to the fryer.

DETAILED DESCRIPTION OF THE INVENTION

Figure 1:
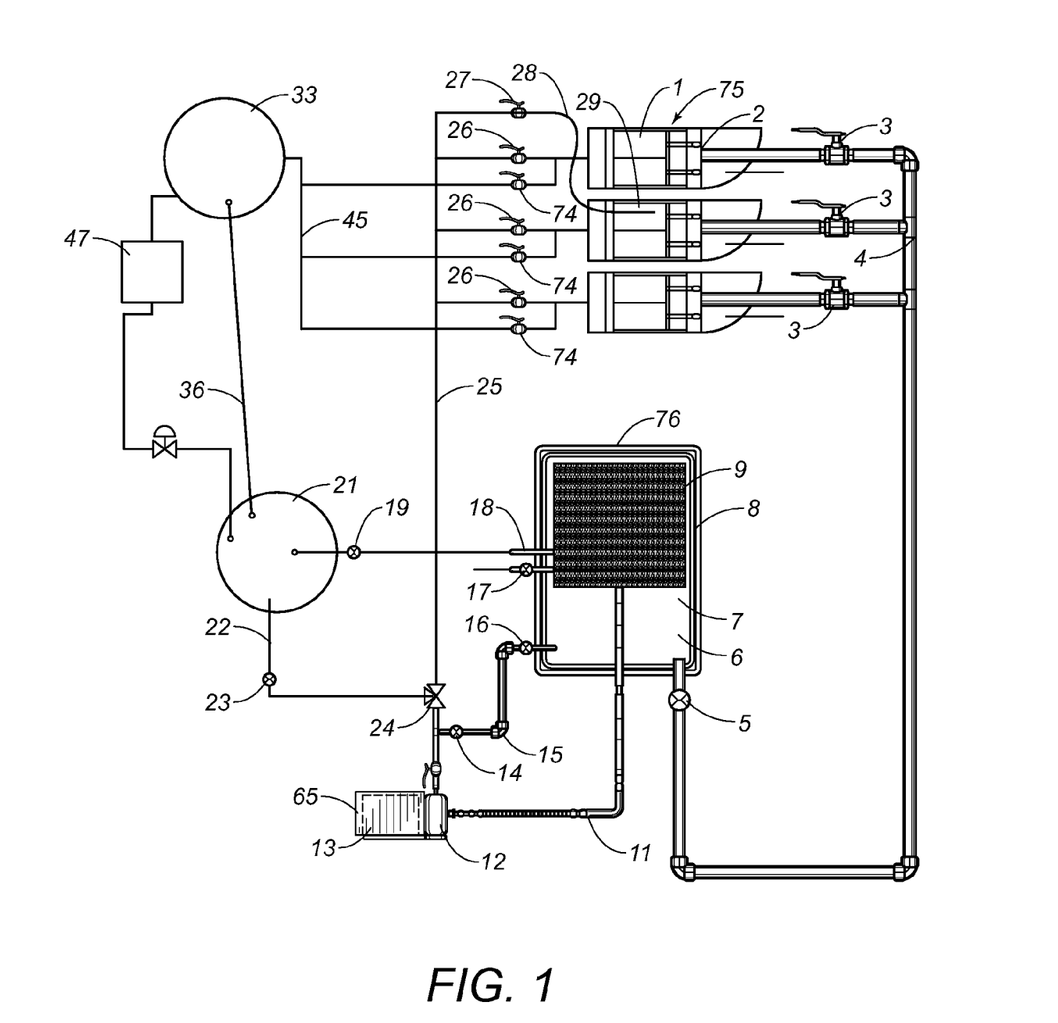
FIG. 1 is a plan view of the fryer oil usage system of the present invention.

Referring to FIG. 1, there is shown the fryer oil usage system 100 in accordance with preferred embodiment of the present invention. The fryer oil usage system 100 includes fryers 75 that have vats 1 and drains 2. As can be seen, the valve means are two-way valves 3 connected to the drains 2 of the fryers 75. The valves 3 have a line 4 through which the oil from the fryers 75 flows through to the first filtering means 76. Line 4 has a backflow prevention device 5 so as to prevent oil from flowing from the first filtering means 76 back to the fryers 75. The first filtering means has a housing 7, a lid 6, a seal 8 and a filtration media 9. The filtration media 9 is kept within housing 7 by closing the lid against the seal 8 of the housing 7. The seal 8 acts to give the housing a gas-tight seal. Oil flowing from line 4 into the filter housing 7 is passed through filtration media 9 to the drain of the filter 10 where it passes in line 11 to the pump 12. The pump 12 causes oil to flow from the vats 1 of the fryers 75 through the drains 2, the valves 3, and line 4 and through the first filtering means 76 to the pump 12 by means of a vacuum pressure. The housing 7 of the first filtering means 76 has an air relief line 18 in the event air builds up in the housing 7. The air relief line 18 has a backflow prevention device 19 so as to prevent air from going into the housing 7 of the first filtering means 76. A pressure relief valve 17 is also attached to the housing 7.

Once oil passes through line 11 to the pump 12, it is sent to the selecting means 24 where it can either flow by line 22 to the second oil storage container 21, by line 25 back to the vats 1 of the fryers 75, or through the polishing line 15 back to the first filtering means 76. The pump 12 has a motor 13 in a weather-protective housing 65. In the preferred embodiment, the selecting means 24 is a three-way valve. When the three-way valve 24 is positioned to block the flow of oil, oil flows through the polishing line 15 back to the first filtering means 76. The blockage of flow of oil by the three-way valve 24 causes a rise in pressure in the outlet line of the pump 12 which opens a pressure relief valve 14 and allows flow in the polishing line 15. There is a backflow prevention device 16 on polishing line 15 so as to prevent flow from going from the first filtering means 76 back to the pump 12.

When the three-way valve 24 is positioned to allow flow to the second oil storage container 21, oil flows from the three-way valve 24 through line 22 to the second oil storage container 21. There is a backflow prevention device 23 on line 22. When the three-way valve 24 is set to allow flow of oil to the fryers 75, oil flows through line 25 to valves 26. Valves 26 are typical two-way valves which can be opened and closed manually. When valves 26 are opened, oil flows from line 25 into the vats 1 of the fryers 75. Oil can also flow from line 25 through valve 27 where it flows through a flexible line 28 to a hot oil sprayer 29.

Still referring to FIG. 1, the first oil storage container 33 is connected by line 45 to the fryers 75. An inert gas supplying means 47 is connected to the first oil storage container 33. In the preferred embodiment, the inert gas supplying means 47 is a supply of nitrogen gas. Nitrogen is supplied from the nitrogen supply 47 so as to create a nitrogen blanket in the vapor space of the first oil storage container 33. The pressure from the nitrogen supply 47 also forces oil through line 45 to the fryers 75. This accomplished when valves 74 are open. Valves 74 are typical two-way valves which can be opened or closed manually. Therefore, when valves 74 are in the open position, oil flows from the first oil storage container 33 to the vats 1 of the fryers 75 because of the pressure supplied by the nitrogen blanket from the nitrogen supply 47. The nitrogen blanket in the first oil storage container 33 helps ensure that the oxygen and other environmental contaminants are removed from the vapor space above the oil in the first oil storage container 33. This also reduces humidity and oxidation of the oil so as to cause the oil to stay fresher longer. Alternatively, the second oil storage container 21 may be directly connected to the nitrogen supply 47, using a separate line and regulator. Nitrogen passes from the first oil storage container 33 by line 36 to the second oil storage container 21. Thus, the second oil storage container 21 also has a nitrogen blanket in its vapor space. The nitrogen blanket of the vapor space has the same preservative qualities for the oil in the second oil storage container 21 as does the nitrogen in the vapor space of the first oil storage container 33.

Figure 2:
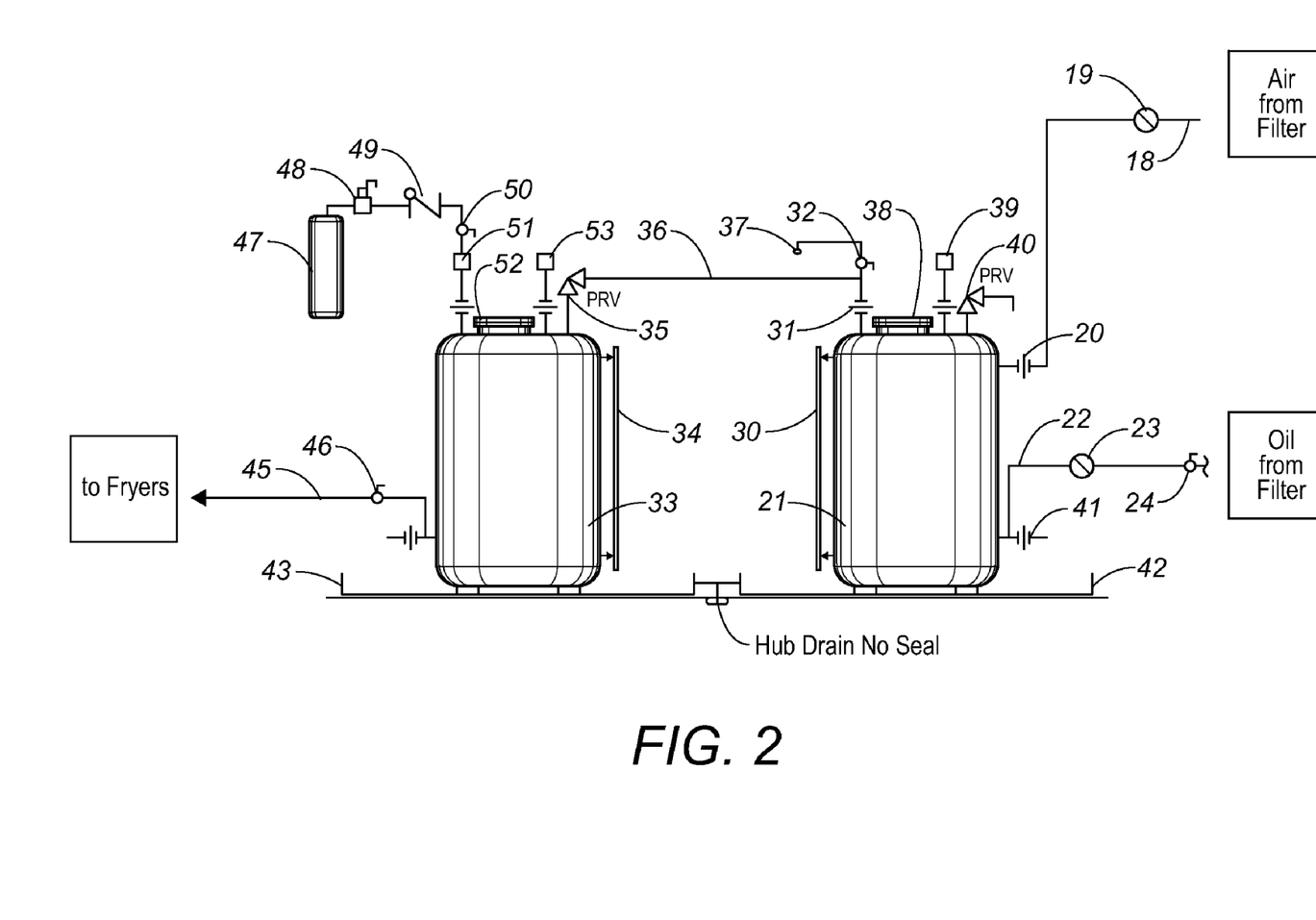
FIG. 2 is a perspective view of the oil storage containers of the present invention.

FIG. 2 shows a detailed view of the first oil storage container 33, the second oil storage container 21, and the nitrogen supply 47. Nitrogen travels from the nitrogen supply 47 through a nitrogen regulator 48 then through a backflow prevention device 49 to a valve 50. Valve 50 is a typical needle valve that can be opened or closed manually. When valve 50 is opened, nitrogen flows from the nitrogen supply 47 to the first oil storage container 33. The pressure of the nitrogen in the first oil storage container 33 is shown on pressure indicator 51. The first oil storage container 33 has a manway access 52 for cleaning the first oil storage container 33. As can be seen, the container 33 also has a level indicator 53 and a visual level indicator 34.

The first oil storage container 33 can sit in a oil spill containment basin 43, if required. Oil can be added to the first oil storage container 33 by inlet nozzle 44. Pressure of nitrogen by the nitrogen supply 47 causes oil to flow through line 45. Valve 46 is a typical two-way valve that can be opened or closed manually. When valve 46 is opened, oil travels through line 45 to the vats 1 of the fryers 75. Nitrogen in the vapor space of the first oil storage container 33 travels through a pressure relief valve 35 to the second oil storage container 21 through line 36. Air from filter housing 7 can also travel into the second oil storage container 21 through line 18. The second oil storage container 21 can alternatively be directly connected to the nitrogen supply. Backflow prevention device 19 prevents any vapor from traveling from the second oil storage container 21 to the filter housing 7. When air travels from the filtering housing 7 to the second oil storage container 21, there may be a need to release air from the second oil storage container 21. Air and/or nitrogen is released from the second oil storage container 21 by opening valve 32 and releasing it through air filter 37. Valve 32 is a typical two-way valve that can be opened or closed manually. The second oil storage container 21 also has a pressure relief valve 40 for relieving nitrogen or air in the vapor space of the second oil storage container 21.

The second oil storage container 21 has a manway access for cleaning the second oil storage container 21. The second oil storage container 21 has a level indicator 39 and a visual level indicator 30. The second oil storage container 21 can sit in an oil spill containment basin 42, if required.

Oil travels from the selecting means 24 through line 22 into the second oil storage container 21. A backflow prevention device 23 exists on line 22 so as to keep oil from traveling from the second oil storage container 21 back to the selecting means 24. The second oil storage container 21 has a discharge fitting 41 for draining oil from the container 21.

Figure 3:
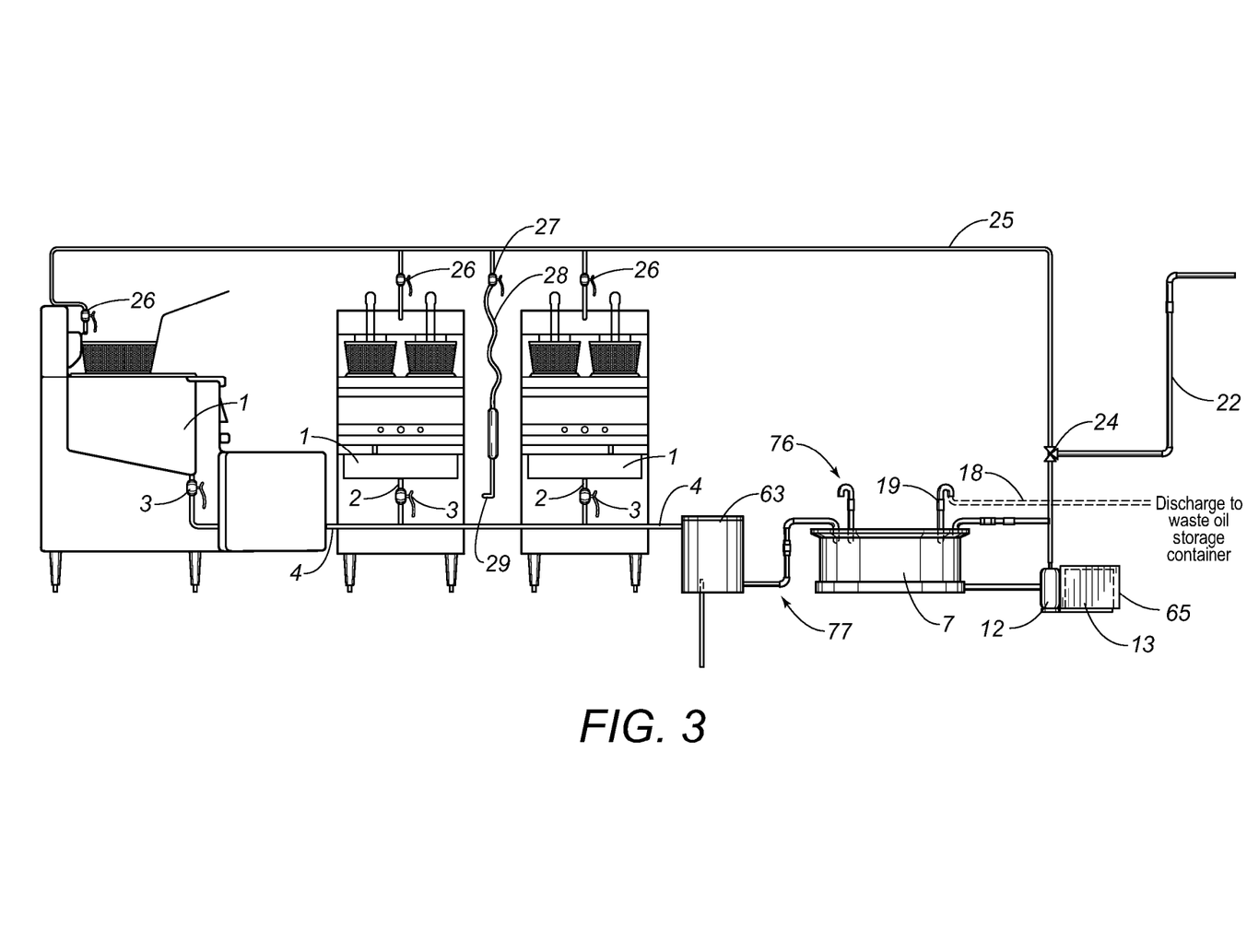
FIG. 3 is a first alternative embodiment of the fryer oil usage system of the present invention.

Referring to FIG. 3, there is shown a first alternative embodiment of the present invention. The embodiment is the same as those shown in FIGS. 1 and 2, except that the filtering system has a primary hot oil filter 63 and a hot oil filter 7. Hot oil filter 7 is the same as the first filtering means 76 in FIG. 1. Oil flows from the drain line 4 of the fryers 75 into the filtering system. The first stage of filter is the primary hot oil filter 63 where large solids are removed. The oil then flows from the primary hot oil filter 63 through line 77 into the hot oil filter 7. Oil is filtered, as stated above, in the hot oil filter 7 and flows through line 11 to the pump 12. Oil flows from the pump to the selecting means 24, which is typically a three-way valve. Oil can flow from the pump 12 through the polishing line 15, through the recycle line 25 or through the waste oil line 22 depending on which position the selecting means 24 is placed.

Figure 4:
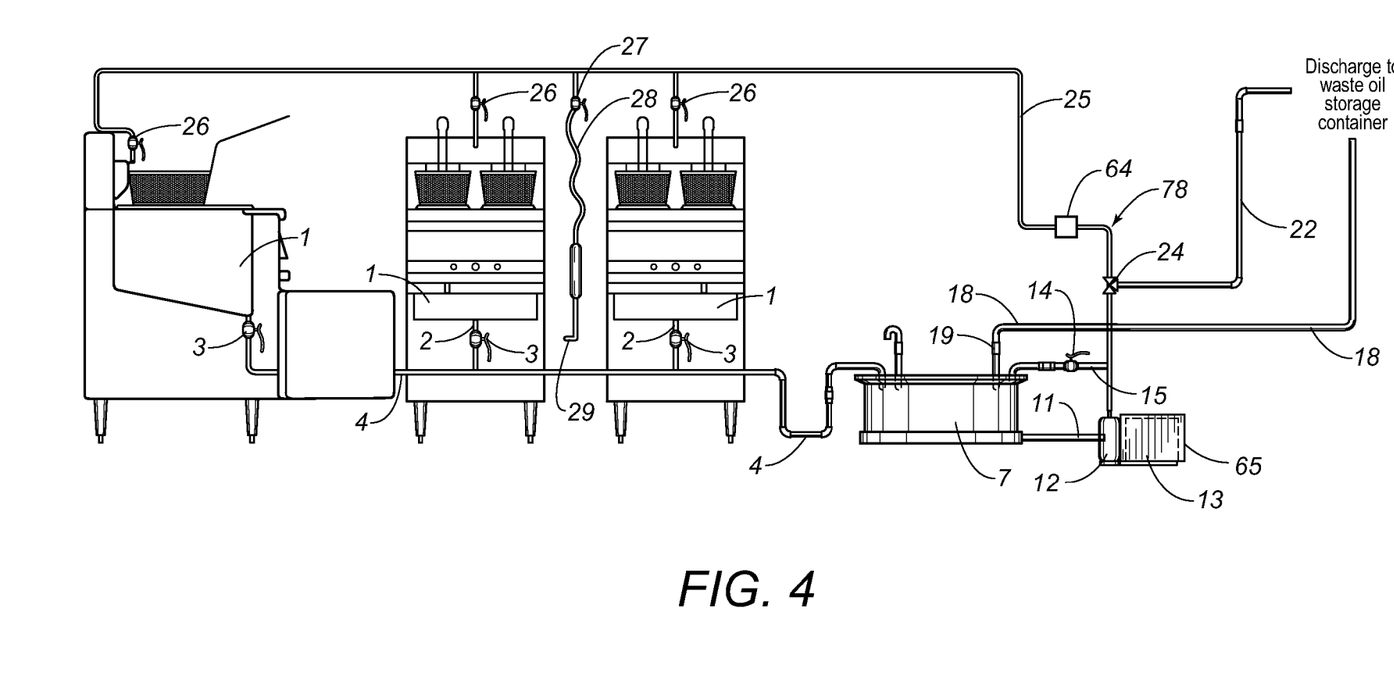
FIG. 4 is a second alternative embodiment of the fryer oil usage system of the present invention.

Referring to FIG. 4, there is shown a second alternative embodiment of the present invention. Oil is filtered through the first filtering means 76 and travels to the pump 12 through line 11. Oil then flows from the pump 12 to the selecting means 24, which is a three-way valve. When the three-way valve is positioned to block the flow of oil, pressure in the oil line causes the pressure relief valve 14 to allow the flow of oil through the polishing line 15 back to the first filtering means 76. Oil is continuously recycled, or "polished," when the three-way valve is set to block the flow of oil. The three-way valve 24 can also be set to a second position that allows oil to flow to the second oil storage container 21 through line 22. The three-way valve 24 can be set to a third position allowing oil to travel through line 78 to a second filtering means 64. The second filtering means 64 removes solid particulates from the oil and gives the user an option to add preservatives to the oil. After passing through the second filtering means 64, oil passes from line 25 to the valves 26 and then to the vats 1 of the fryers 75.

Figure 5:
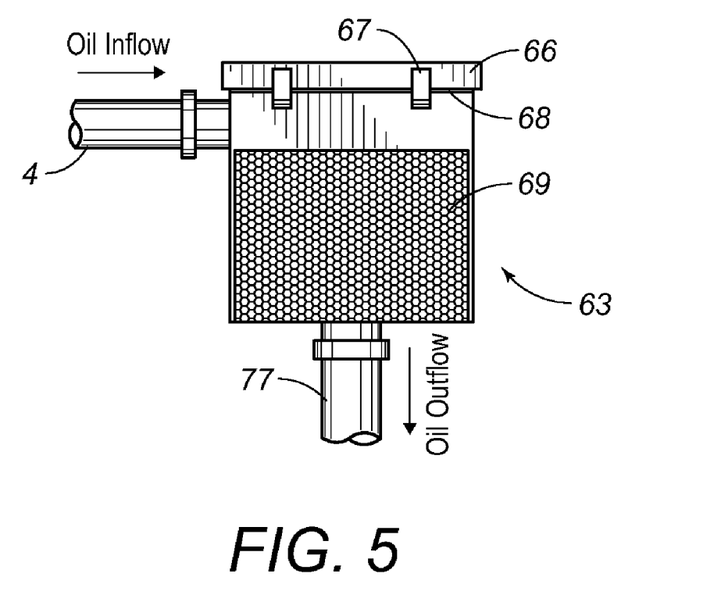
FIG. 5 shows a perspective view of the primary hot oil filter of the first filtering means of the first alternative embodiment as shown in FIG. 3.

FIG. 5 shows the primary hot oil filter 63 of the first alternative embodiment shown in FIG. 3. As can be seen, the filter 63 has a cover 66 that fits over a seal 68 and is secured the filter 63 by latch 67. Inside the filter 63 is a filter basket 69 which removes large particulate matter.

Figure 6:
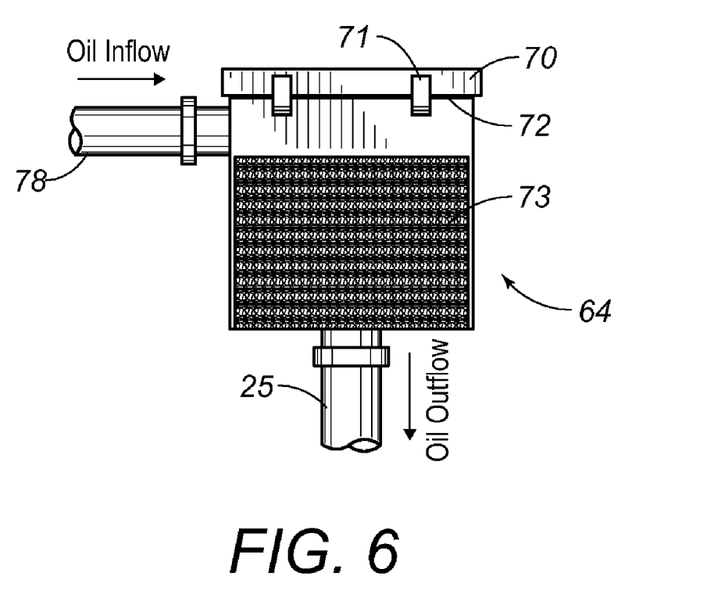
FIG. 6 is a perspective view of the second filtering means of the second alternative embodiment as shown in FIG. 4.

FIG. 6 shows the second filtering means of the second alternative embodiment shown in FIG. 4. The second filtering means 64 has a cover 70 that fits over a seal 72 and is secured to the second filtering means 64 by latch 71. Inside the second filtering means 64 is a filter basket 73 which is removable and can be of a fine mesh screen so as to remove small particles, or it can be a mesh filter basket that is used for holding additives that are added to the oil as oil passes through the second filtering means 64.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A system for fryer oil usage comprising:
   at least one fryer having a vat and a drain, the drain having a valve means for opening and closing the drain;
   a first oil storage container having an oil delivery line in fluid communication with the vat of the fryer, said first oil storage container having an inert gas blanket in a vapor space of said first oil storage container;
   a second oil storage container having an inert gas blanket in a vapor space of said second oil storage container, said second oil storage container being in fluid communication with the valve means of the drain of the fryer,
   an inert gas supplying means for maintaining a constant pressure in said vapor space of said first oil storage container and in said vapor space of said second oil storage container, said inert gas supplying means in valved communication with said first and second oil storage containers;
   a first filtering means for filtering oil from the fryer, said first filtering means in fluid communication with said valve means of the drain of the fryer;
   a pumping means for filtering the oil passing from the fryer, said pumping means being in fluid communication with said first filtering means and said second oil storage container, said pumping means being in valved communication with the vat of the fryer, said pumping means for vacuuming oil from the fryer through said first filtering means;
   a polishing means for recycling oil through said first filtering means, said polishing means being in fluid communication with said pumping means and with said first filtering means; and
   a selecting means for selecting the direction of a flow of oil, said selecting means movable to a first position for blocking said flow of oil, a second position for allowing said flow of oil to said second oil storage container, and a third position for allowing said flow to the vat of the fryer, said selecting means being in fluid communication with said pumping means and with said polishing means and with said second oil storage container.

2. The system of claim 1, further comprising:
   a second filtering means or pre-filter for filtering oil passing from the fryer, said second filtering means being in fluid communication with said first filtering means and in valved communication with the fryer.

3. The system of claim 1, said first oil storage container being a container comprised of a material maintaining a positive internal pressure and temperature rating of 400° F., said second oil storage container being a container comprised of a material maintaining a positive internal pressure and a temperature rating of up to 400° F.

4. The system of claim 1, said first filtering means comprising:
   a housing able to withstand 400° F. and able to operate under a vacuum, said housing having a body and lid;
   a filtration media suitable for removing solids from the oil of the fryer, said filtration media being located inside said housing and removable through said lid; and
   a seal located between said body and said lid of said housing, said seal having the ability to withstand 400° F. and having the ability to operate in a vacuum.

5. The system of claim 2, said second filtering means comprising:
   a housing having a removable cover, said housing being in fluid communication with said selecting means and in valved communication with the vat of the fryer; and
   a filtration media being removable from said housing through said cover, said filtration media being located inside said housing and removable through said lid, said filtration media of said first filtering means being suitable for removing particulate matter that is smaller than the solids removed by said second filtering means.

6. The system of claim 2, said first filtering means being in spaced relation to the fryer, said second filtering means being in spaced relation to the fryer, said pumping means being in spaced relation to the fryer, said second oil storage container being in spaced relation to the fryer, said first oil storage container being in spaced relation to the fryer, said inert gas supplying means being in spaced relation to the fryer, said polishing means being in spaced relation to the fryer, and said selecting means being in spaced relation to the fryer.

* * * * *